(12) United States Patent
Oh et al.

(10) Patent No.: US 12,282,674 B2
(45) Date of Patent: Apr. 22, 2025

(54) EVIDENCE COLLECTION GUIDANCE METHOD AND APPARATUS FOR FILE SELECTION AND COMPUTER-READABLE STORAGE MEDIUM

(71) Applicant: ELECTRONICS AND TELECOMMUNICATIONS RESEARCH INSTITUTE, Daejeon (KR)

(72) Inventors: Jung-Hoon Oh, Daejeon (KR); Hyun-Uk Hwang, Daejeon (KR); Seung-Yong Lee, Daejeon (KR); Jun-Su Kim, Daejeon (KR); Joong-Soo Han, Daejeon (KR); Hye-Jin Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 203 days.

(21) Appl. No.: 17/863,634

(22) Filed: Jul. 13, 2022

(65) Prior Publication Data

US 2024/0020039 A1   Jan. 18, 2024

(51) Int. Cl.
*G06F 3/06* (2006.01)

(52) U.S. Cl.
CPC .......... *G06F 3/0643* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 8,422,730 B2* | 4/2013 | Kim | G06F 21/64 382/100 |
| 2011/0191533 A1* | 8/2011 | Coulter | G06F 16/13 711/112 |
| 2014/0082001 A1* | 3/2014 | Jang | G06F 21/552 707/755 |
| 2015/0212758 A1* | 7/2015 | Lee | G06F 21/552 710/74 |
| 2016/0078240 A1 | 3/2016 | Kang et al. | |
| 2017/0206102 A1* | 7/2017 | Lee | G06F 21/00 |

(Continued)

FOREIGN PATENT DOCUMENTS

| | | |
|---|---|---|
| JP | 2012-123533 A | 6/2012 |
| KR | 10-2012-0086926 A | 8/2012 |
| KR | 10-2014-0036444 A | 3/2014 |

(Continued)

*Primary Examiner* — Michael Alsip
(74) *Attorney, Agent, or Firm* — LRK PATENT LAW FIRM (57) ABSTRACT

Disclosed herein are an evidence collection guidance method and apparatus for file selection. The evidence collection guidance method includes generating pieces of preliminary analysis information that are pieces of collection target information, setting levels of the pieces of preliminary analysis information based on predefined rules, and generating and outputting notification information including summary description information and follow-up measure items related to the pieces of preliminary analysis information corresponding to the levels.

13 Claims, 8 Drawing Sheets

(56) References Cited

U.S. PATENT DOCUMENTS

2019/0026661 A1   1/2019   Cortell et al.

FOREIGN PATENT DOCUMENTS

| KR | 10-2014-0140717 A | 12/2014 |
| KR | 10-2015-0089699 A | 8/2015 |
| KR | 10-2018-0094756 A | 8/2018 |
| KR | 10-2021-0017839 A | 2/2021 |

* cited by examiner

EVIDENCE COLLECTION GUIDANCE METHOD AND APPARATUS FOR FILE SELECTION AND COMPUTER-READABLE STORAGE MEDIUM

BACKGROUND OF THE INVENTION

1. Technical Field

The present invention relates generally to an evidence collection guidance method, and more particularly to an evidence collection guidance method and apparatus, which provide guidance for the direction and strategy of a search and seizure operation.

2. Description of Related Art

Generally, digital evidence collection refers to collection of data, capable of being used as evidence by securing the objectivity, integrity, reliability, and originality thereof sufficient to be legally admissible, from digital data that can be easily duplicated due to the characteristics thereof and which are characterized in that the original and copies thereof are difficult to distinguish from each other.

Recently, when collecting digital evidence, it has become required by law to selectively collect only evidence pertaining to a case during a search and seizure operation. Therefore, a detective must rapidly search for and isolate evidence pertaining to the corresponding case at the scene of the search and seizure operation.

However, due to limited human resources for investigation and limited search time, it is difficult to efficiently select and seize evidence.

SUMMARY OF THE INVENTION

Accordingly, the present invention has been made keeping in mind the above problems occurring in the prior art, and an object of the present invention is to provide an evidence collection guidance method and apparatus for file selection, which provide in advance a detective with preliminary analysis information that enables the direction and strategy of a search and seizure operation to be determined.

Another object of the present invention is to provide an evidence collection guidance method and apparatus for file selection, which intuitively provide information for evidence collection to a detective.

In accordance with an aspect of the present invention to accomplish the above objects, there is provided an evidence collection guidance method, including generating pieces of preliminary analysis information that are pieces of collection target information, setting levels of the pieces of preliminary analysis information based on predefined rules, and generating and outputting notification information including summary description information and follow-up measure items related to the pieces of preliminary analysis information corresponding to the levels.

Generating pieces of preliminary analysis information may include identifying a disk mounted on a collection target device, obtaining volume information of the disk by analyzing a partition table of the disk, accessing volumes of the disk based on the volume information of the disk, analyzing a file system of each volume, determining, based on the analyzed file system, whether the volume is a system volume, when it is determined that the volume is the system volume, generating artifact-based preliminary analysis information, and when generation of the artifact-based preliminary analysis information is completed, generating file-system-based preliminary analysis information.

Generating the pieces of preliminary analysis information may further include when it is determined that the volume is not a system volume, determining whether the volume is a data volume, and when it is determined that the volume is the data volume, generating file-system-based preliminary analysis information.

Generating the artifact-based preliminary analysis information may include identifying pieces of artifact information in a predefined order, determining whether multiple pieces of artifact information are required, when it is determined that multiple pieces of artifact information are required, reconfiguring artifact information by combining the multiple pieces of artifact information, deleting information less closely related to a collection target from the artifact information, accessing the artifact information, from which the information less closely related to the collection target is deleted, in a predefined order, and generating artifact-based preliminary analysis information based on detection data extracted from the artifact information using a detection signature.

Generating the file-system-based preliminary analysis information may include identifying pieces of file system information in a predefined order, collecting the identified pieces of file system information, deleting information less closely related to a collection target from the file system information, accessing the file system information, from which the information less closely related to the collection target is deleted, in a predefined order, and generating file-system-based preliminary analysis information based on detection data extracted from the file system information using a detection signature.

Setting the levels of the pieces of preliminary analysis information may include accessing the pieces of preliminary analysis information in a predefined order, comparing the pieces of preliminary analysis information with level rules of preset reference preliminary analysis information, when corresponding preliminary analysis information corresponds to a caution rule, setting a level of the corresponding preliminary analysis information to a caution level, and setting color information of the corresponding preliminary analysis information to a first color, when the corresponding preliminary analysis information corresponds to a confirm rule, setting the level of the corresponding preliminary analysis information to a confirm level, and setting color information of the corresponding preliminary analysis information to a second color, and when the corresponding preliminary analysis information corresponds neither to a caution rule nor to a confirm rule, setting the level of the corresponding preliminary analysis information to a normal level, and setting color information of the corresponding preliminary analysis information to a third color.

Generating and outputting the notification information may include checking a level of corresponding preliminary analysis information, when the level of the corresponding preliminary analysis information is a caution level, generating summary description information and follow-up measure items corresponding to the caution level, and adding the summary description information and follow-up measure items to the notification information, when the level of the corresponding preliminary analysis information is a confirm level, generating summary description information and follow-up measure items corresponding to the confirm level, and adding the summary description information and the follow-up measure items to the notification information, and outputting the notification information to which the summary description information and the follow-up measure items are added.

In accordance with another aspect of the present invention to accomplish the above objects, there is provided an evidence collection guidance apparatus, including memory configured to store a control program for evidence collection guidance, and a processor configured to execute the control program for evidence collection guidance, wherein the processor is configured to generate pieces of preliminary analysis information that are pieces of collection target information, set levels of the pieces of preliminary analysis information based on predefined rules, and generate and output notification information including summary description information and follow-up measure items related to the pieces of preliminary analysis information corresponding to the levels.

The processor may be configured to identify a disk mounted on a collection target device, obtain volume information of the disk by analyzing a partition table of the disk, access volumes of the disk based on the volume information of the disk, analyze a file system of each volume, determine, based on the analyzed file system, whether the volume is a system volume, when it is determined that the volume is the system volume, generate artifact-based preliminary analysis information, and when generation of the artifact-based preliminary analysis information is completed, generate file-system-based preliminary analysis information.

The processor may be configured to, when it is determined that the volume is not a system volume, determine whether the volume is a data volume, and when it is determined that the volume is the data volume, generate file-system-based preliminary analysis information.

The processor may be configured to identify pieces of artifact information in a predefined order, determine whether multiple pieces of artifact information are required, when it is determined that multiple pieces of artifact information are required, reconfigure artifact information by combining the multiple pieces of artifact information, delete information less closely related to a collection target from the artifact information, access the artifact information, from which the information less closely related to the collection target is deleted, in a predefined order, and generate artifact-based preliminary analysis information based on detection data extracted from the artifact information using a detection signature.

The processor may be configured to identify pieces of file system information in a predefined order, collect the identified pieces of file system information, delete information less closely related to a collection target from the file system information, access the file system information, from which the information less closely related to the collection target is deleted, in a predefined order, and generate file-system-based preliminary analysis information based on detection data extracted from the file system information using a detection signature.

The processor may be configured to access the pieces of preliminary analysis information in a predefined order, compare the pieces of preliminary analysis information with level rules of preset reference preliminary analysis information, when corresponding preliminary analysis information corresponds to a caution rule, set a level of the corresponding preliminary analysis information to a caution level, and set color information of the corresponding preliminary analysis information to a first color, when the corresponding preliminary analysis information corresponds to a confirm rule, set the level of the corresponding preliminary analysis information to a confirm level, and set color information of the corresponding preliminary analysis information to a second color, and when the corresponding preliminary analysis information corresponds neither to a caution rule nor to a confirm rule, set the level of the corresponding preliminary analysis information to a normal level, and set color information of the corresponding preliminary analysis information to a third color.

The processor may be configured to check a level of corresponding preliminary analysis information, when the level of the corresponding preliminary analysis information is a caution level, generate summary description information and follow-up measure items corresponding to the caution level, and add the summary description information and follow-up measure items to the notification information, when the level of the corresponding preliminary analysis information is a confirm level, generate summary description information and follow-up measure items corresponding to the confirm level, and add the summary description information and the follow-up measure items to the notification information, and output the notification information to which the summary description information and the follow-up measure items are added.

In accordance with a further aspect of the present invention to accomplish the above objects, there is provided a computer-readable storage medium storing a computer program, the computer program including instructions allowing a processor to perform operations when executed by the processor, the operations including generating pieces of preliminary analysis information that are pieces of collection target information, setting levels of the pieces of preliminary analysis information based on predefined rules, and generating and outputting notification information including summary description information and follow-up measure items related to the pieces of preliminary analysis information corresponding to the levels.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Embodiments of the present invention will now be described in detail with reference to the accompanying drawings. Like numerals refer to like elements throughout, and overlapping descriptions will be omitted.

Figure 1:
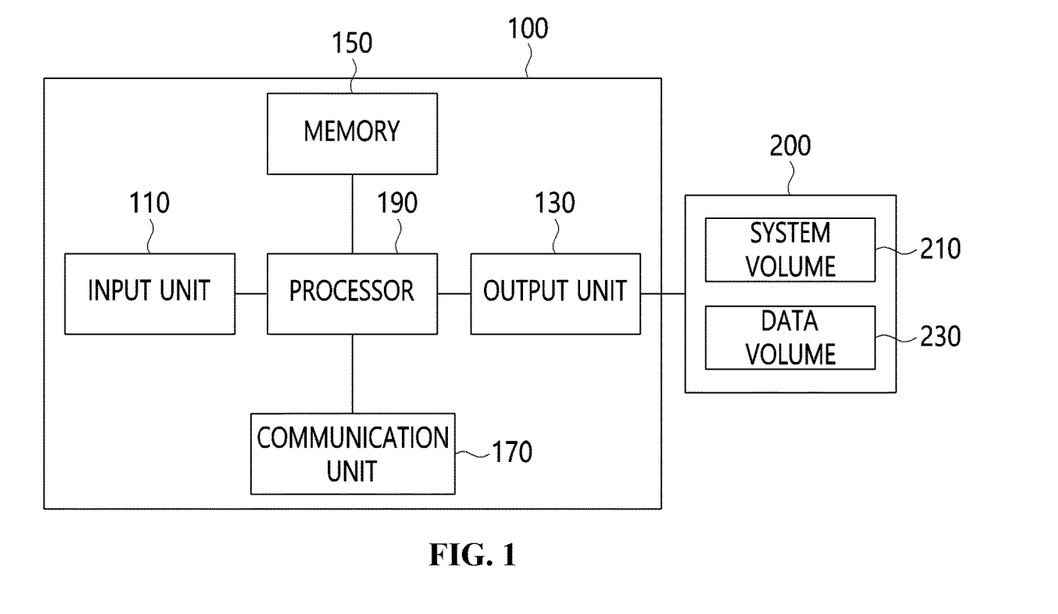
FIG. 1 is a block diagram illustrating an evidence collection guidance apparatus according to an embodiment of the present invention.

FIG. 1 is a block diagram illustrating an evidence collection guidance apparatus according to an embodiment of the present invention.

Referring to FIG. 1, an evidence collection guidance apparatus 100 according to an embodiment may include an input unit 110, an output unit 130, memory 150, a communication unit 170, and a processor 190.

The input unit 110 may include at least one of input interfaces for receiving selection information from a user. The input unit 110 may receive the selection information from the user based on the state of clicking of a mouse by the user or based on designation of an area by dragging of the mouse by the user.

For example, when the user (e.g., a detective) clicks the mouse so as to receive preliminary analysis information, the entire operation of the evidence collection guidance apparatus may be automatically performed.

The output unit 130 may display screens corresponding to input information received from the input unit 110 based on the input information. In an embodiment, when the user's input information is applied to the input unit 110, the output unit 130 may control a display device so that summary description information, follow-up measure items, and analysis result information related to pieces of preliminary analysis information are displayed on the display device.

The memory 150 may store various types of data for the entire operation, such as a control program for evidence collection guidance. In detail, in the memory 150, data and instructions for multiple applications executed on the evidence collection guidance apparatus and for the operation of the evidence collection guidance apparatus may be stored.

Further, various types of data, such as preliminary analysis information, collected from a collection target device 200 for evidence collection, may be stored in the memory 150, but the type of data stored in the memory 150 is not limited thereto.

The memory 150 may include, but is not limited to, magnetic storage media or flash storage media.

The communication unit 170 may be a device including hardware and software required for transmitting/receiving signals, such as a control signal and a data signal, to/from other network devices through wired/wireless connection to the other network devices.

The communication unit 170 may transmit/receive screens on which summary description information, follow-up measure items, and analysis result information related to pieces of preliminary analysis information generated by the control program are displayed.

The communication unit 170 may perform communication using not only Third Generation (3G), Long Term Evolution (LTE), and Fifth Generation (5G), but also Low-Power Wireless Network (LPWN) and Low-Power Wide Area Network (LPWAN), such as Narrowband Internet of things (NB-IoT), Long Range (LoRa), SigFox, or LTE-CAT1.

The communication unit 170 may perform communication using a communication method based on a wireless LAN such as Wi-Fi 80211a/b/g/n, as well as a wired Local Area Network (LAN). In addition, the communication unit 170 may also perform communication with an external device using a communication method such as Near-Field Communication (NFC) or Bluetooth.

The communication unit 170 is not an essential configuration of the evidence collection guidance apparatus 100, and may be mounted or not mounted in the evidence collection guidance apparatus 100 according to the circumstances.

The processor 190, which is a kind of Central Processing Unit (CPU), may control the overall operation of the evidence collection guidance apparatus 100.

The processor 190 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The collection target device 200 may be a device in which a program is installed for evidence collection. The collection target device 200 may be a Personal Computer (PC) system. The evidence collection guidance apparatus 100 may read a system volume 210 and a data volume 230 from a storage device installed in the PC system, and may then obtain file system information and artifact information therefrom.

As long as the program is run with administrator privileges, the program may access the system volume 210 and the data volume 230 using a scheme for directly opening a mounted logical drive.

The evidence collection guidance apparatus 100 may obtain file system information and artifact information from the system volume 210. The evidence collection guidance apparatus 100 may obtain file system information from the data volume 230.

The file system information may include a file/directory structure, file metadata, and file data information obtained by analyzing volume metadata information and volume file system of the storage device connected to the collection target device 200.

When the volume is a system volume in which an operating system is installed, the artifact information may include information obtained by acquiring and analyzing data of a file located in a specific path through analysis of a file system, without using an operating system Application Programming Interface (API).

The collection target device 200 is not limited to a PC system, and may include various types of devices, such as a notebook or a tablet.

Meanwhile, the processor 190 of the evidence collection guidance apparatus may execute a control program for providing evidence collection guidance. The processor 190 may control the operations to be performed shown in FIGS. 2 to 8.

Figure 2:
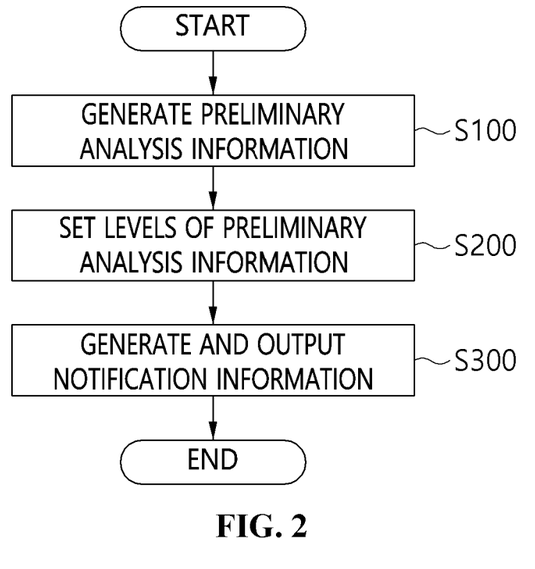
FIG. 2 is a flowchart illustrating an evidence collection guidance method performed by the evidence collection guidance apparatus according to an embodiment of the present invention.

FIG. 2 is a flowchart illustrating an evidence collection guidance method performed by the evidence collection guidance apparatus according to an embodiment of the present invention, and FIGS. 3 to 8 are flowcharts illustrating the detailed operation of the evidence collection guidance method according to an embodiment of the present invention.

Referring to FIG. 2, the evidence collection guidance method performed by the evidence collection guidance apparatus may include generating pieces of preliminary analysis information at step S100, setting the levels of the pieces of preliminary analysis information at step S200, and generating and outputting notification information for the pieces of preliminary analysis information, the levels of which are set, at step S300.

At step S100, the evidence collection guidance apparatus 100 may generate the preliminary analysis information by reading a system volume and a data volume from a collection target device. Step S100 will be described in detail below with reference to FIG. 3.

Figure 3:
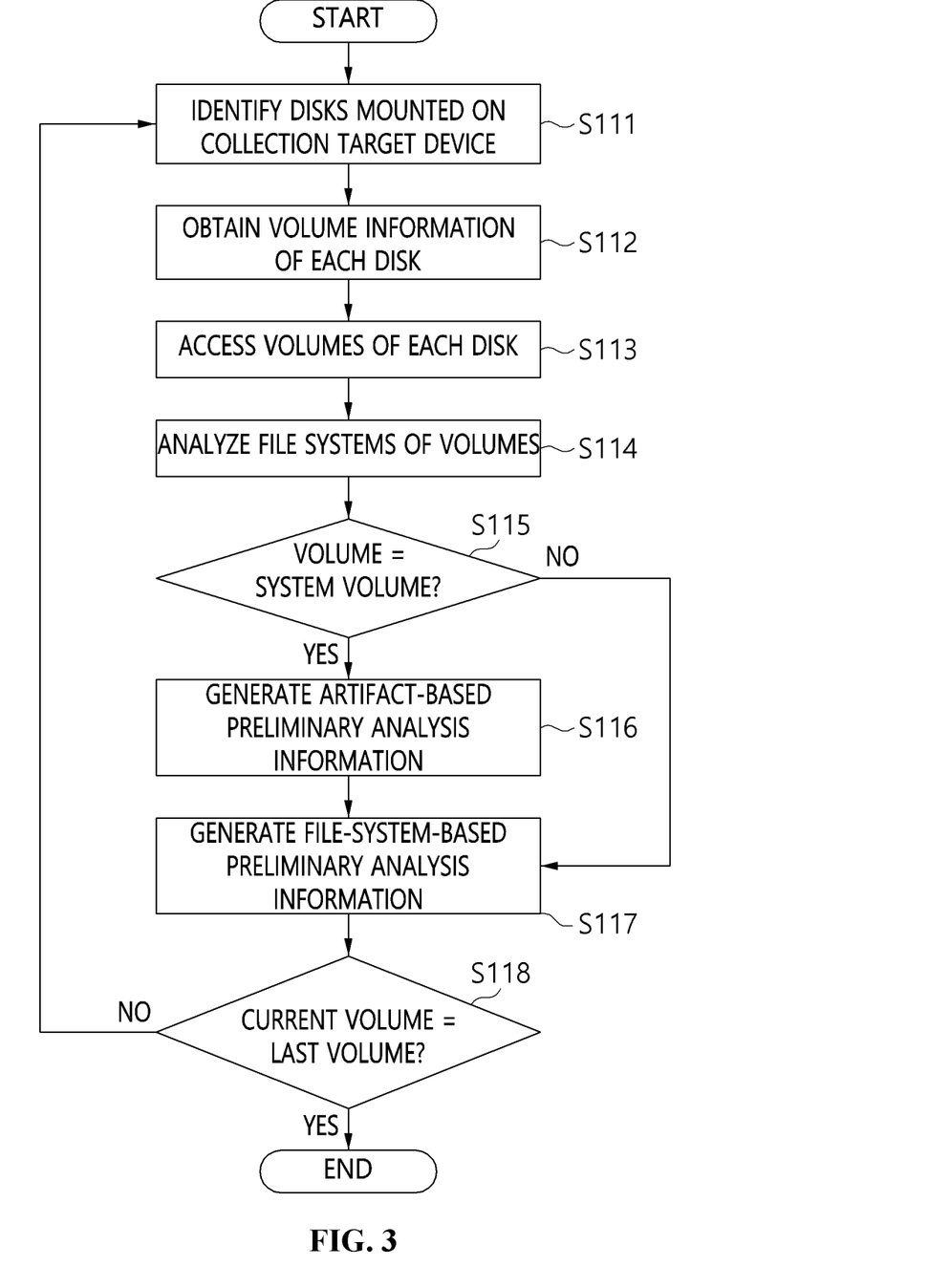
FIGS. 3 to 8 are flowcharts illustrating the detailed operation of the evidence collection guidance method according to an embodiment of the present invention.

As illustrated in FIG. 3, the evidence collection guidance apparatus 100 may identify disks mounted in the collection target device at step S111. The evidence collection guidance apparatus may identify the disks using an operating system API.

The evidence collection guidance apparatus 100 may obtain, from each identified disk, volume information of the corresponding disk at step S112. The evidence collection guidance apparatus 100 may obtain the volume information of each disk by analyzing partitions created on the disk.

The evidence collection guidance apparatus 100 may access the volumes of each disk at step S113. The evidence collection guidance apparatus 100 may align the volumes of the obtained disk volume information in one line, and may then sequentially access the volumes.

The evidence collection guidance apparatus 100 may analyze the file systems of volumes at step S114. The evidence collection guidance apparatus 100 may analyze a file system such as New Technology File System (NTFS), File Allocation Table (FAT) 32, or Extensible File Allocation Table (ExFAT) stored in the volumes.

The evidence collection guidance apparatus 100 may check, based on the analyzed file system, whether the corresponding volume is a system volume at step S115. The evidence collection guidance apparatus 100 may check whether the corresponding volume is a system volume or a data volume by determining, based on the result of analysis of the file system, whether an operating system is installed.

If it is determined that the volume is a system volume, the evidence collection guidance apparatus 100 may generate artifact-based preliminary analysis information at step S116, and may generate file-system-based preliminary analysis information at step S117.

The evidence collection guidance apparatus 100 may generate artifact-based preliminary analysis information, such as system information, external information, and user behavior information, by analyzing artifacts stored in the system volume.

The evidence collection guidance apparatus 100 may generate file-system-based preliminary analysis information, such as disk information and document statistical information, by analyzing the file system information.

The evidence collection guidance apparatus 100 may determine whether the current volume is the last volume, and may terminate the generation of preliminary analysis information at step S118 if it is determined that there are no more volumes to be analyzed.

On the other hand, when it is determined at step S115 that the corresponding volume is a data volume rather than a system volume, the evidence collection guidance apparatus 100 may generate file-system-based preliminary analysis information at step S117.

Meanwhile, step S116 of generating the artifact-based preliminary analysis information will be described in detail below with reference to FIG. 4.

Figure 4:
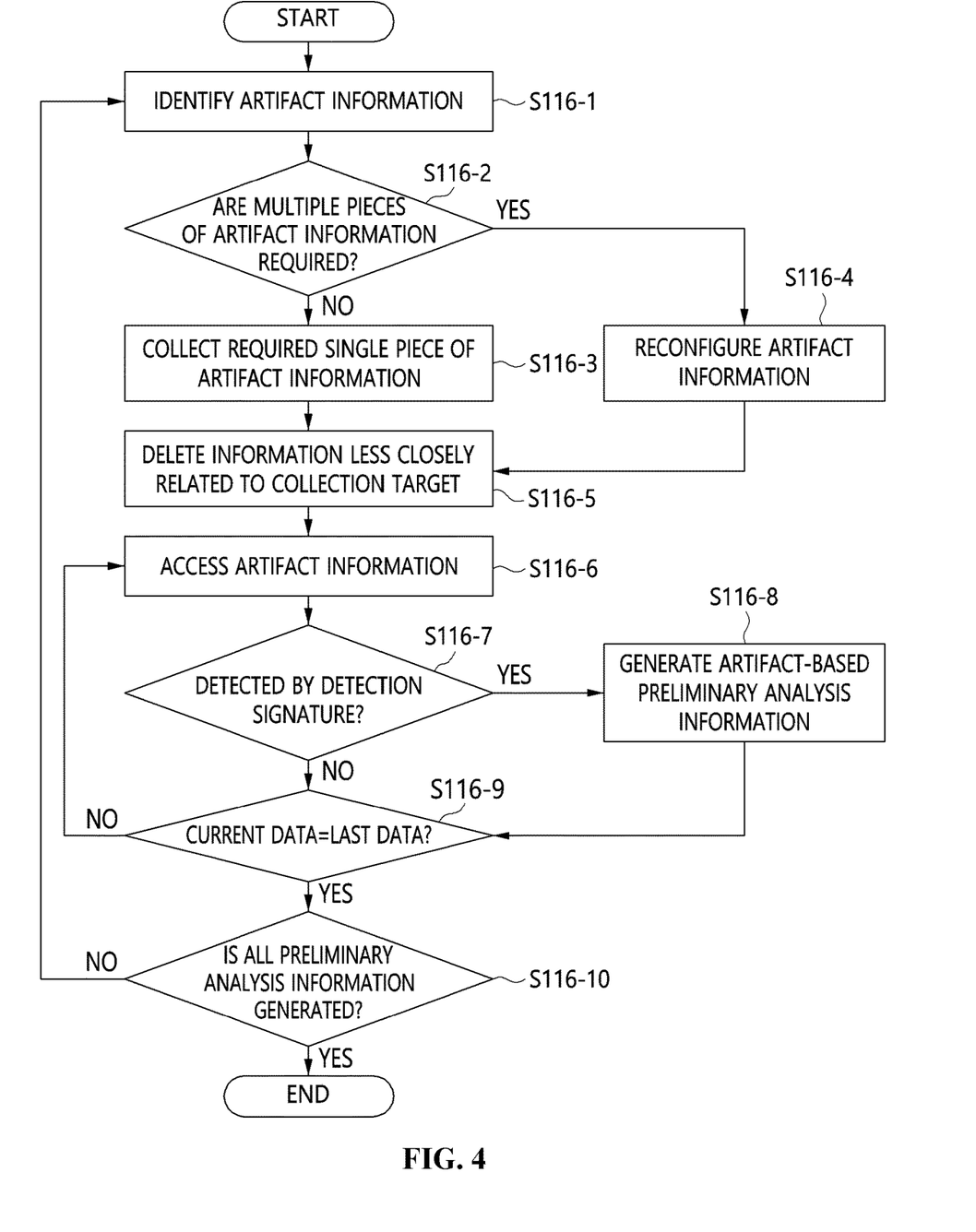

As illustrated in FIG. 4, the evidence collection guidance apparatus 100 may identify pieces of artifact information in a predefined order at step S116-1.

The evidence collection guidance apparatus 100 may determine whether multiple pieces of artifact information are required at step S116-2. The evidence collection guidance apparatus 100 may check the number of pieces of required artifact information depending on the type of artifact-based preliminary analysis information to be generated.

When multiple pieces of artifact information are required, the evidence collection guidance apparatus 100 may reconfigure multiple pieces of required artifact information by collecting and combining required artifact information at step S116-4.

On the other hand, when a single piece of artifact information is required, the evidence collection guidance apparatus 100 may collect only the corresponding artifact information at step S116-3.

The evidence collection guidance apparatus 100 may perform a preprocessing task of deleting data less closely related to a collection target from the pieces of artifact information at step S116-5. The evidence collection guidance apparatus 100 may delete data automatically generated by an operating system or a program.

The evidence collection guidance apparatus 100 may access the pieces of artifact information on which preprocessing has been performed in a predefined order at step S116-6.

The evidence collection guidance apparatus 100 may extract detection data using a detection signature at step S116-7.

The evidence collection guidance apparatus 100 may generate artifact-based preliminary analysis information based on the extracted detection data at step S116-8.

The evidence collection guidance apparatus 100 may determine whether the current data is the last data at step S116-9. If it is determined that the current data is the last data, the evidence collection guidance apparatus 100 may check whether all of preliminary analysis information has been generated, and may then terminate the generation of the artifact-based preliminary analysis information at step S116-10.

Meanwhile, step S117 of generating the file-system-based preliminary analysis information will be described in detail below with reference to FIG. 5.

Figure 5:
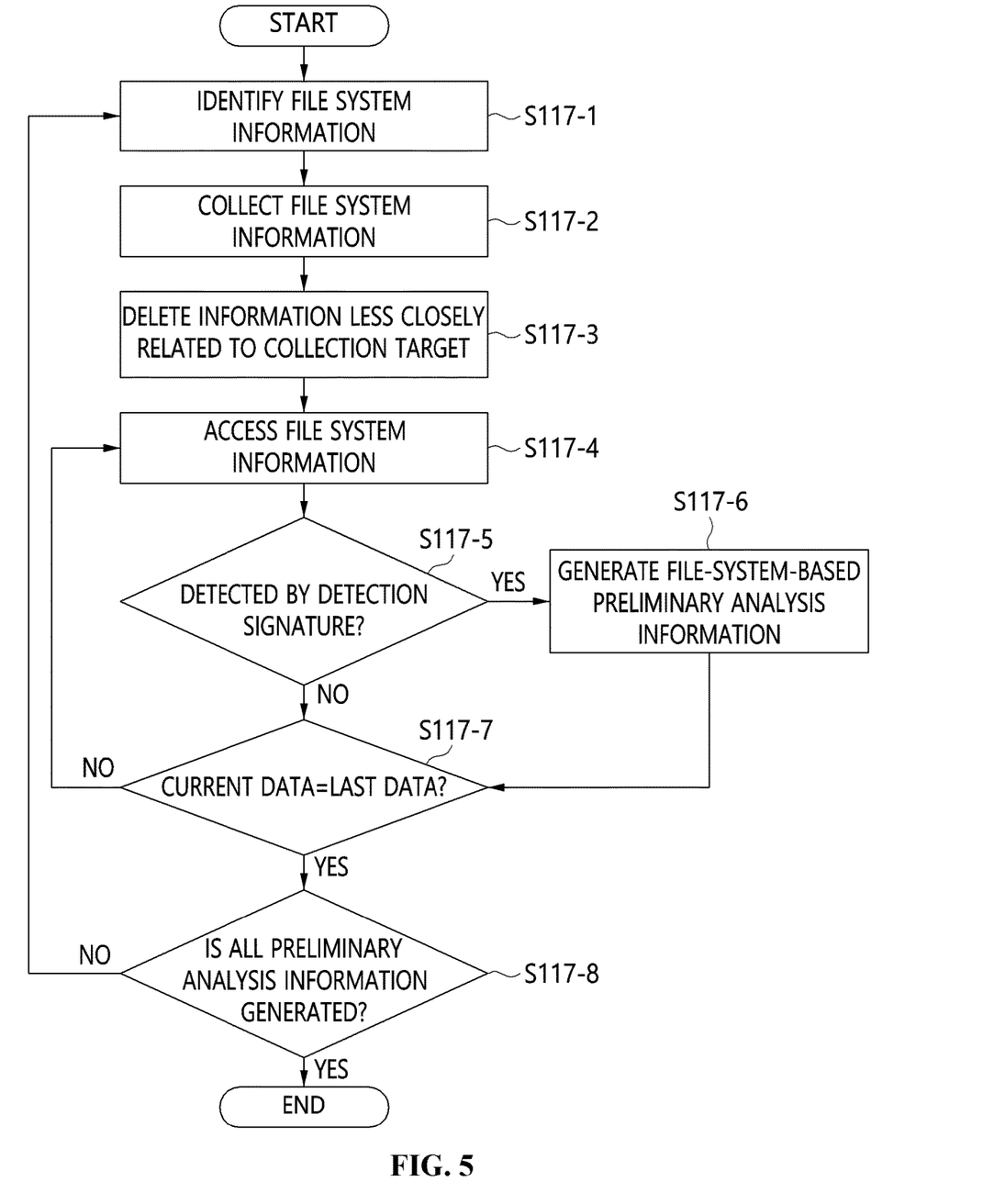

As illustrated in FIG. 5, the evidence collection guidance apparatus 100 may identify pieces of file system information in a predefined order at step 117-1.

The evidence collection guidance apparatus 100 may collect pieces of file system information at step 117-2.

The evidence collection guidance apparatus 100 may perform a preprocessing task of deleting data less closely related to a collection target from the pieces of file system information at step S117-3. The evidence collection guidance apparatus 100 may delete data automatically generated by an operating system or a program.

The evidence collection guidance apparatus 100 may access the pieces of file system information on which preprocessing has been performed in a predefined order at step S117-4.

The evidence collection guidance apparatus 100 may extract detection data using a detection signature at step S117-5.

The evidence collection guidance apparatus 100 may generate file system-based preliminary analysis information based on the extracted detection data at step S117-6.

The evidence collection guidance apparatus 100 may determine whether the current data is the last data at step S117-7. If it is determined that the current data is the last data, the evidence collection guidance apparatus 100 may check whether all of preliminary analysis information has been generated, and may then terminate the generation of the file system-based preliminary analysis information at step S117-8.

Referring back to FIG. 2, at step S200, the evidence collection guidance apparatus 100 may set the levels of the pieces of preliminary analysis information. Here, the preliminary analysis information may include artifact-based preliminary analysis information and/or file-system-based preliminary analysis information.

Step S200 of setting the levels of the pieces of preliminary analysis information will be described in detail below with reference to FIG. 6.

Figure 6:
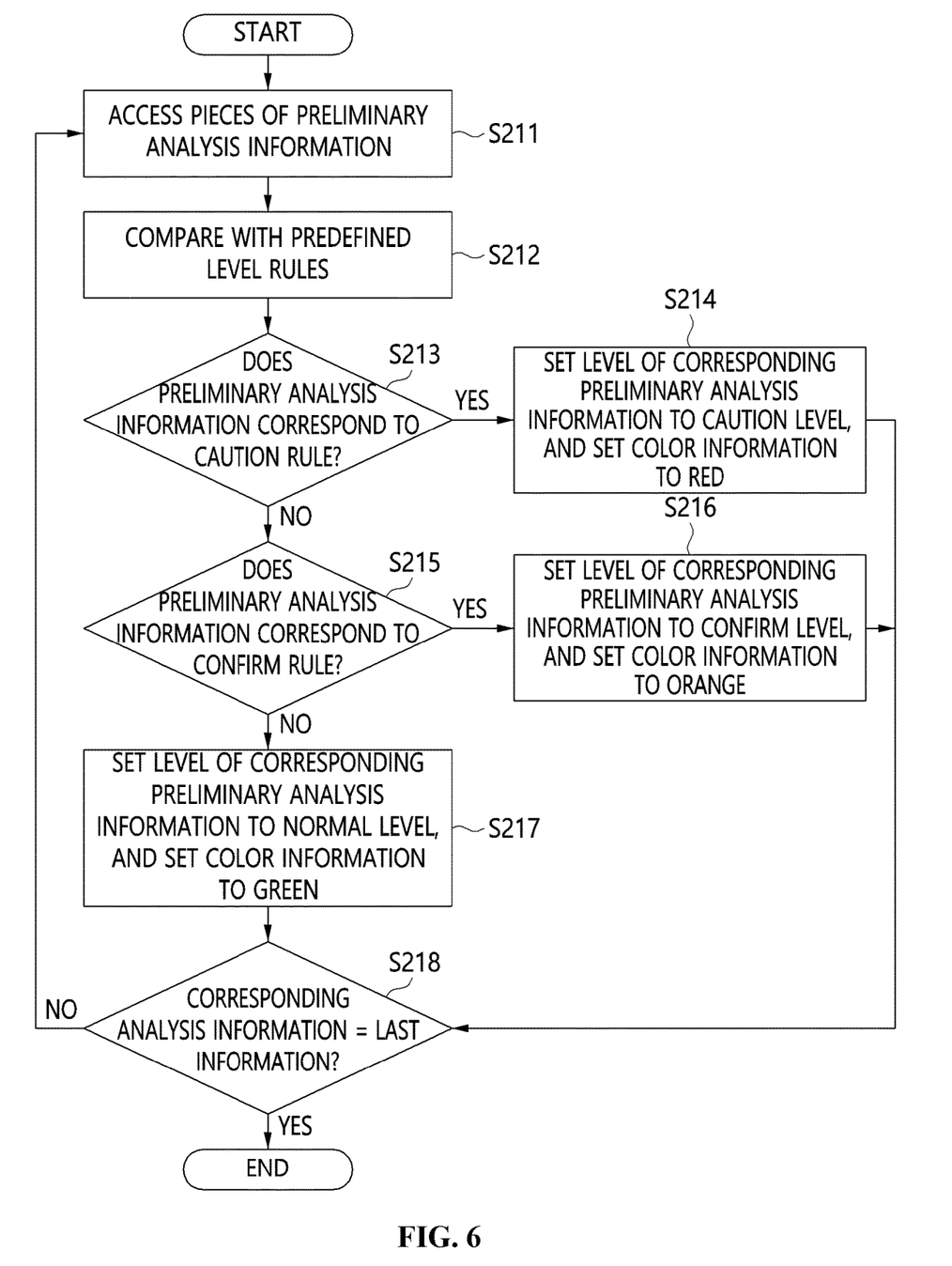

As shown in FIG. 6, the evidence collection guidance apparatus 100 may access pieces of generated preliminary analysis information in a predefined order at step S211.

The evidence collection guidance apparatus 100 may compare the pieces of preliminary analysis information with preset level rules at step S212. Here, the level rules may be level rules assigned to preset reference preliminary analysis information.

The evidence collection guidance apparatus 100 may compare the corresponding preliminary analysis information with reference preliminary analysis information, and when the preliminary analysis information corresponds to a 'caution' rule at step S213, may set the level of the preliminary analysis information to a 'caution' level, and may set the color of the preliminary analysis information, the level of which is set to the 'caution' level, to a first color, for example red, at step S214.

Unlike this, when the preliminary analysis information corresponds to a 'confirm' rule at step S215, the evidence collection guidance apparatus 100 may set the level of the preliminary analysis information to a 'confirm' level, and may set the color of the preliminary analysis information, the level of which is set to the 'confirm' level, to a second color, for example orange, at step S216.

When the preliminary analysis information corresponds neither to a 'caution' rule nor to a 'confirm' rule, the evidence collection guidance apparatus 100 may set the level of the preliminary analysis information to a 'normal' level, and may set the color of the preliminary analysis information, the level of which is set to the 'normal' level, to a third color, for example green, at step S217.

The evidence collection guidance apparatus 100 may check whether the preliminary analysis information is the last information, and when there is no more preliminary analysis information, the level of which is to be set, may terminate the level-setting task at step S218.

Referring back to FIG. 2, at step S300, the evidence collection guidance apparatus 100 may generate and output notification information for the pieces of preliminary analysis information, the levels of which are set.

The evidence collection guidance apparatus 100 may generate notification information including summary description information and follow-up measure items related to the pieces of preliminary analysis information. The evidence collection guidance apparatus may output the generated notification information and analysis result information.

Here, the evidence collection guidance apparatus 100 may output notification information and analysis result information only for preliminary analysis information, the level of which is equal to or greater than a certain level. For example, the evidence collection guidance apparatus 100 may generate and output notification information only when the level of preliminary analysis information is the 'caution' or 'confirm' level.

Step S300 of generating and outputting notification information for the preliminary analysis information will be described in detail below with reference to FIGS. 7 and 8.

Figure 7:
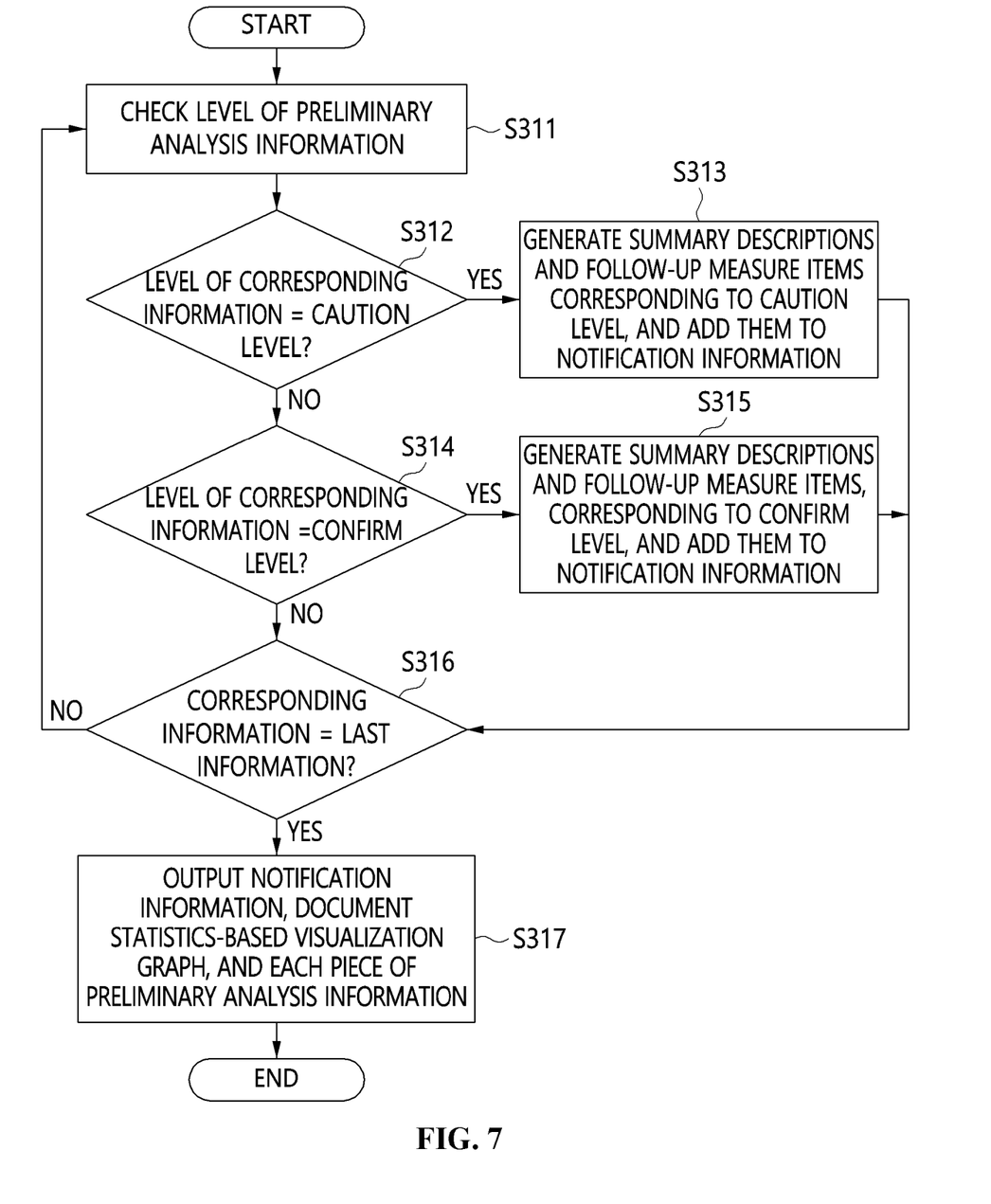

As illustrated in FIG. 7, the evidence collection guidance apparatus 100 may check the level of preliminary analysis information at step S311.

The evidence collection guidance apparatus 100 may check whether the level of the preliminary analysis information is a 'caution' level at step S312. When the level of the preliminary analysis information is found to be the 'caution' level, the evidence collection guidance apparatus 100 may generate summary descriptions and follow-up measure items related to preliminary analysis information corresponding to the 'caution' level, and may add them to the notification information at step S313.

Here, the summary descriptions may be information about the reason for determining that the level of the preliminary analysis information is the 'caution' level. The follow-up measure items may be information indicating which type of analysis is to be performed when it is determined that the level of the preliminary analysis information is the 'caution' level.

On the other hand, when the level of the preliminary analysis information is not the 'caution' level, the evidence collection guidance apparatus 100 may check whether the level of the preliminary analysis information is the 'confirm' level at step S314. When the level of the preliminary analysis information is the 'confirm' level, the evidence collection guidance apparatus 100 may generate summary descriptions and follow-up measure items related to preliminary analysis information corresponding to the 'confirm' level, and may add them to the notification information at step S315.

On the other hand, when the level of the preliminary analysis information is not the 'confirm' level, the evidence collection guidance apparatus 100 may check whether the corresponding preliminary analysis information is the last information at step S316.

When there is no more preliminary analysis information to be checked, the evidence collection guidance apparatus 100 may output (display) the generated notification information and the analysis result information corresponding thereto at step S317. Here, the analysis result information may include, but is not limited to, document statistics-based visualization graph and each piece of preliminary analysis information.

Figure 8:
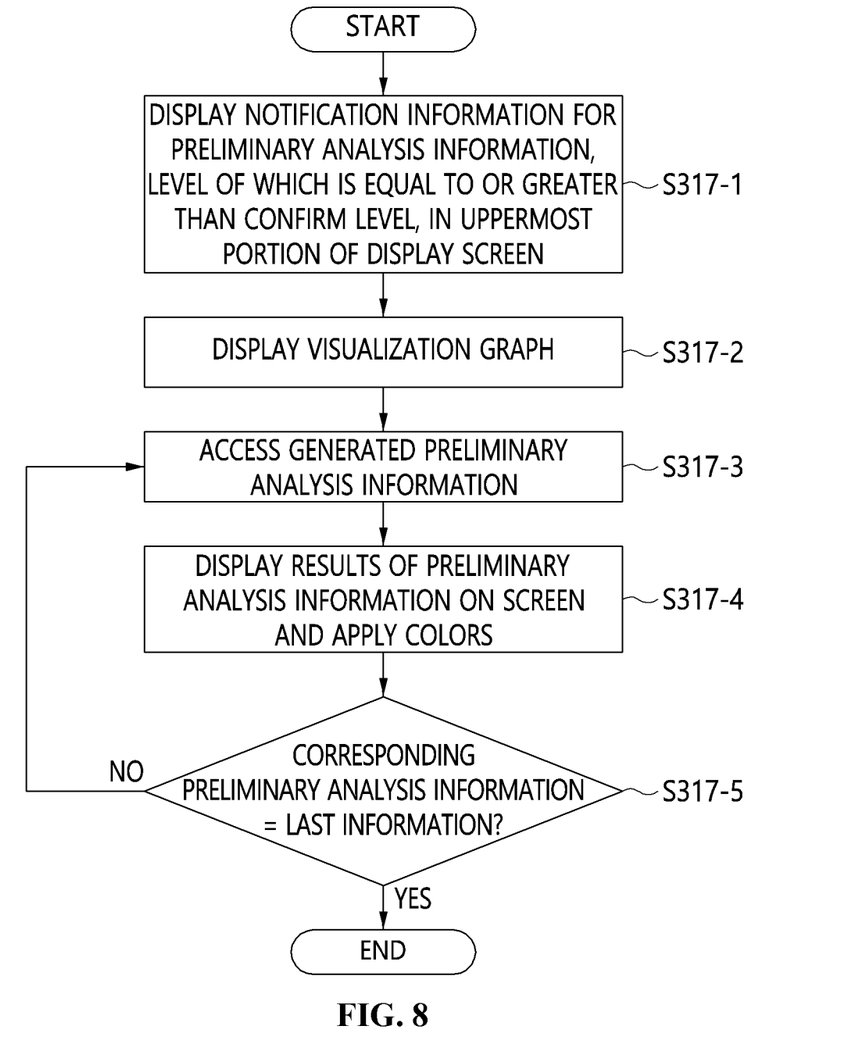

More specifically, as illustrated in FIG. 8, the evidence collection guidance apparatus 100 may display notification information related to preliminary analysis information, the level of which is equal to or greater than the 'confirm' level, in the uppermost portion of a display screen at step S317-1. Here, the preliminary analysis information, the level of which is equal to or greater than the 'confirm' level, may be preliminary analysis information corresponding to the 'caution' level and the 'confirm' level.

The evidence collection guidance apparatus 100 may generate a visualization graph based on document statistical information, and may output the generated visualization graph at step S317-2. Here, the visualization graph may be, but is not limited to, a bar graph or a graph of broken lines.

The evidence collection guidance apparatus 100 may access the remaining pieces of preliminary analysis information, the levels of which are equal to or greater than the 'confirm' level, in a predefined order at step S317-3, and may apply colors in conformity with the levels of the pieces of preliminary analysis information at step S317-4.

When the preliminary analysis information, the level of which is equal to or greater than the 'confirm' level, is determined to be the last information, the evidence collection guidance apparatus 100 may terminate the step of outputting (displaying) the notification information and analysis result information.

Various embodiments of the present specification may be implemented as software (e.g., a program) including instructions stored on a machine-readable (e.g., computer-readable) storage medium (e.g., memory such as internal memory or external memory). A machine, which is a device capable of calling instructions from the storage medium and operating in compliance with the called instructions, may include an electronic device according to the disclosed embodiments. When an instruction is executed by a control unit (e.g., a processor), a function corresponding to the instruction may be performed either directly by the controller or using other components under the control of the control unit. The instructions may include code generated or executed by a compiler or an interpreter. The machine-readable storage medium may be provided in the form of a non-transitory storage medium. Here, the term "non-transitory" means that a storage medium does not take the form of signals and is tangible, without identifying whether data is semi-permanently or temporarily stored in the storage medium.

In accordance with an embodiment, a method according to various embodiments disclosed in the present specification may be provided with the method included in a computer program product.

In accordance with an embodiment, a computer-readable storage medium on which a computer program is stored may include instructions allowing the processor to perform a method including an operation of generating pieces of preliminary analysis information, that is, pieces of collection target information, an operation of setting the levels of the pieces of preliminary analysis information based on predefined rules, and an operation of generating and outputting notification information including summary description information and follow-up measure items related to the pieces of preliminary analysis information corresponding to the levels.

In accordance with an embodiment, a computer program stored on a computer-readable storage medium may include instructions allowing the processor to perform a method including an operation of generating pieces of preliminary analysis information, that is, pieces of collection target information, an operation of setting the levels of the pieces of preliminary analysis information based on predefined rules, and an operation of generating and outputting notification information including summary description information and follow-up measure items related to the pieces of preliminary analysis information corresponding to the levels.

The particular implementations shown and described herein are illustrative examples of the present invention and are not intended to limit the scope of the present invention in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present invention unless the element is specifically described as "essential" or "critical".

According to the present invention, selective seizure may be efficiently conducted within the constraints of limited human resources and limited time by providing information about determination of the direction and strategy of a search and seizure operation to a detective when selective seizure is conducted.

Further, the present invention may provide intuitive information to a detective by displaying information about determination of the direction and strategy of a search and seizure operation on the screen.

Therefore, the spirit of the present invention should not be limitedly defined by the above-described embodiments, and it is appreciated that all ranges of the accompanying claims and equivalents thereof belong to the scope of the spirit of the present invention.

What is claimed is:

1. An evidence collection guidance method, comprising:
generating preliminary analysis information by reading system volume and data volume from a collection target device, wherein the generated preliminary analysis information is separated into different pieces;
setting protocol levels of each piece of preliminary analysis information based on a predefined set of rules; and
generating and outputting notification information including summary description information which comprises information regarding reasons for the selected protocol level of the pieces of the preliminary analysis information and follow-up measure items comprising information on what type of analysis is to be used based on the selected protocol level of the pieces of preliminary analysis information,
wherein generating and outputting the notification information comprises:
checking the protocol level of corresponding preliminary analysis information;

when the protocol level of the corresponding preliminary analysis information is a caution level, generating summary description information and follow-up measure items corresponding to the caution level, and adding the summary description information and follow-up measure items to the notification information;

when the protocol level of the corresponding preliminary analysis information is a confirm level, generating summary description information and follow-up measure items corresponding to the confirm level, and adding the summary description information and the follow-up measure items to the notification information; and outputting the notification information to which the summary description information and the follow-up measure items are added.

2. The evidence collection guidance method of claim 1, wherein generating pieces of preliminary analysis information comprises:
identifying a disk mounted on the collection target device;
obtaining volume information of the disk by analyzing a partition table of the disk;
accessing volumes of the disk based on the volume information of the disk;
analyzing a file system of each volume;
determining, based on the analyzed file system, whether the volume is a system volume;
when it is determined that the volume is the system volume, generating artifact-based preliminary analysis information; and
when generation of the artifact-based preliminary analysis information is completed, generating file-system-based preliminary analysis information.

3. The evidence collection guidance method of claim 2, wherein generating the pieces of preliminary analysis information further comprises:
when it is determined that the volume is not a system volume, determining whether the volume is a data volume; and
when it is determined that the volume is the data volume, generating file-system-based preliminary analysis information.

4. The evidence collection guidance method of claim 2, wherein generating the artifact-based preliminary analysis information comprises:
identifying pieces of artifact information in a predefined order;
determining whether multiple pieces of artifact information are required;
when it is determined that multiple pieces of artifact information are required, reconfiguring artifact information by combining the multiple pieces of artifact information;
deleting information less closely related to a collection target from the artifact information;
accessing the artifact information, from which the information less closely related to the collection target is deleted, in a predefined order; and
generating artifact-based preliminary analysis information based on detection data extracted from the artifact information using a detection signature.

5. The evidence collection guidance method of claim 2, wherein generating the file-system-based preliminary analysis information comprises:
identifying pieces of file system information in a predefined order;
collecting the identified pieces of file system information;
deleting information less closely related to a collection target from the file system information;
accessing the file system information, from which the information less closely related to the collection target is deleted, in a predefined order; and
generating file-system-based preliminary analysis information based on detection data extracted from the file system information using a detection signature.

6. The evidence collection guidance method of claim 1, wherein setting the levels of the pieces of preliminary analysis information comprises:
accessing the pieces of preliminary analysis information in a predefined order;
comparing the pieces of preliminary analysis information with protocol levels of preset reference preliminary analysis information;
when corresponding preliminary analysis information corresponds to a caution rule, setting, the protocol level of the corresponding preliminary analysis information to a caution level, and setting color information of the corresponding preliminary analysis information to a first color;
when the corresponding preliminary analysis information corresponds to a confirm rule, setting the protocol level of the corresponding preliminary analysis information to a confirm level, and setting color information of the corresponding preliminary analysis information to a second color; and
when the corresponding preliminary analysis information corresponds neither to a caution rule nor to a confirm rule, setting the protocol level of the corresponding preliminary analysis information to a normal level, and setting color information of the corresponding preliminary analysis information to a third color.

7. An evidence collection guidance apparatus, comprising:
a memory configured to store a control program for evidence collection guidance; and
a processor configured to execute the control program for evidence collection guidance,
wherein the processor is configured to generate preliminary analysis information by reading system volume and data volume from a collection target device, wherein the generated preliminary analysis information is separated into different pieces, set protocol levels of each piece of preliminary analysis information based on a predefined set of rules, and generate and output notification information including summary description information which comprises information regarding reasons for the selected protocol level of the pieces of the preliminary analysis information and follow-up measure items comprising information on what type of analysis is to be used based on the selected protocol level of the pieces of preliminary analysis information,
wherein the processor is configured to check the protocol level of corresponding preliminary analysis information,
when the protocol level of the corresponding preliminary analysis information is a caution level, generate summary description information and follow-up measure items corresponding to the caution level, and add the summary description information and follow-up measure items to the notification information,
when the protocol level of the corresponding preliminary analysis information is a confirm level, generate summary description information and follow-up measure items corresponding to the confirm level, and add the summary description information and the follow-up measure items to the notification information, and output the notification information to which the summary description information and the follow-up measure items are added.

8. The evidence collection guidance apparatus of claim 7, wherein the processor is configured to:
identify a disk mounted on the collection target device,
obtain volume information of the disk by analyzing a partition table of the disk,
access volumes of the disk based on the volume information of the disk,
analyze a file system of each volume,
determine, based on the analyzed file system, whether the volume is a system volume,
when it is determined that the volume is the system volume, generate artifact-based preliminary analysis information, and
when generation of the artifact-based preliminary analysis information is completed, generate file-system-based preliminary analysis information.

9. The evidence collection guidance apparatus of claim 8, wherein the processor is configured to:
when it is determined that the volume is not a system volume, determine whether the volume is a data volume, and
when it is determined that the volume is the data volume, generate file-system-based preliminary analysis information.

10. The evidence collection guidance apparatus of claim 8, wherein the processor is configured to:
identify pieces of artifact information in a predefined order,
determine whether multiple pieces of artifact information are required,
when it is determined that multiple pieces of artifact information are required, reconfigure artifact information by combining the multiple pieces of artifact information,
delete information less closely related to a collection target from the artifact information,
access the artifact information, from which the information less closely related to the collection target is deleted, in a predefined order, and
generate artifact-based preliminary analysis information based on detection data extracted from the artifact information using a detection signature.

11. The evidence collection guidance apparatus of claim 8, wherein the processor is configured to:
identify pieces of file system information in a predefined order,
collect the identified pieces of file system information,
delete information less closely related to a collection target from the file system information,
access the file system information, from which the information less closely related to the collection target is deleted, in a predefined order, and
generate file-system-based preliminary analysis information based on detection data extracted from the file system information using a detection signature.

12. The evidence collection guidance apparatus of claim 7, wherein the processor is configured to:

access the pieces of preliminary analysis information in a predefined order,
compare the pieces of preliminary analysis information with protocol levels of preset reference preliminary analysis information,
when corresponding preliminary analysis information corresponds to a caution rule, set the protocol level of the corresponding preliminary analysis information to a caution level, and set color information of the corresponding preliminary analysis information to a first color,
when the corresponding preliminary analysis information corresponds to a confirm rule, set the protocol level of the corresponding preliminary analysis information to a confirm level, and set color information of the corresponding preliminary analysis information to a second color, and
when the corresponding preliminary analysis information corresponds neither to a caution rule nor to a confirm rule, set the protocol level of the corresponding preliminary analysis information to a normal level, and set color information of the corresponding preliminary analysis information to a third color.

13. A non-transitory computer-readable storage medium storing a computer program, the computer program comprising instructions allowing a processor to perform operations when executed by the processor, the operations comprising:
generating preliminary analysis information by reading system volume and data volume from a collection target device, wherein the generated preliminary analysis information is separated into different pieces;
setting protocol levels of each piece of preliminary analysis information based on a predefined set of rules; and
generating and outputting notification information including summary description information which comprises information regarding reasons for the selected protocol level of the pieces of the preliminary analysis information and follow-up measure items comprising information on what type of analysis is to be used based on the selected protocol level of the pieces of preliminary analysis information,
wherein generating and outputting the notification information comprises:
checking the protocol level of corresponding preliminary analysis information;
when the protocol level of the corresponding preliminary analysis information is a caution level, generating summary description information and follow-up measure items corresponding to the caution level, and adding the summary description information and follow-up measure items to the notification information;
when the protocol level of the corresponding preliminary analysis information is a confirm level, generating summary description information and follow-up measure items corresponding to the confirm level, and adding the summary description information and the follow-up measure items to the notification information; and
outputting the notification information to which the summary description information and the follow-up measure items are added.

* * * * *